Oct. 16, 1928.  
J. W. FOLEY  
ROLLER BEARING  
Filed March 14, 1927

1,687,755

2 Sheets-Sheet 1

Inventor:
John W. Foley
BY
Atty.

Oct. 16, 1928.

J. W. FOLEY 1,687,755

ROLLER BEARING

Filed March 14, 1927     2 Sheets-Sheet 2

Inventor:
John W. Foley

Patented Oct. 16, 1928.

1,687,755

UNITED STATES PATENT OFFICE.

JOHN W. FOLEY, OF CHICAGO, ILLINOIS.

ROLLER BEARING.

Application filed March 14, 1927. Serial No. 175,030.

This invention relates to improvements in roller bearings, and one of the objects of the invention is to provide an improved bearing of this character having means for reducing to a minimum both radial and thrust friction between the parts.

Figure 1:
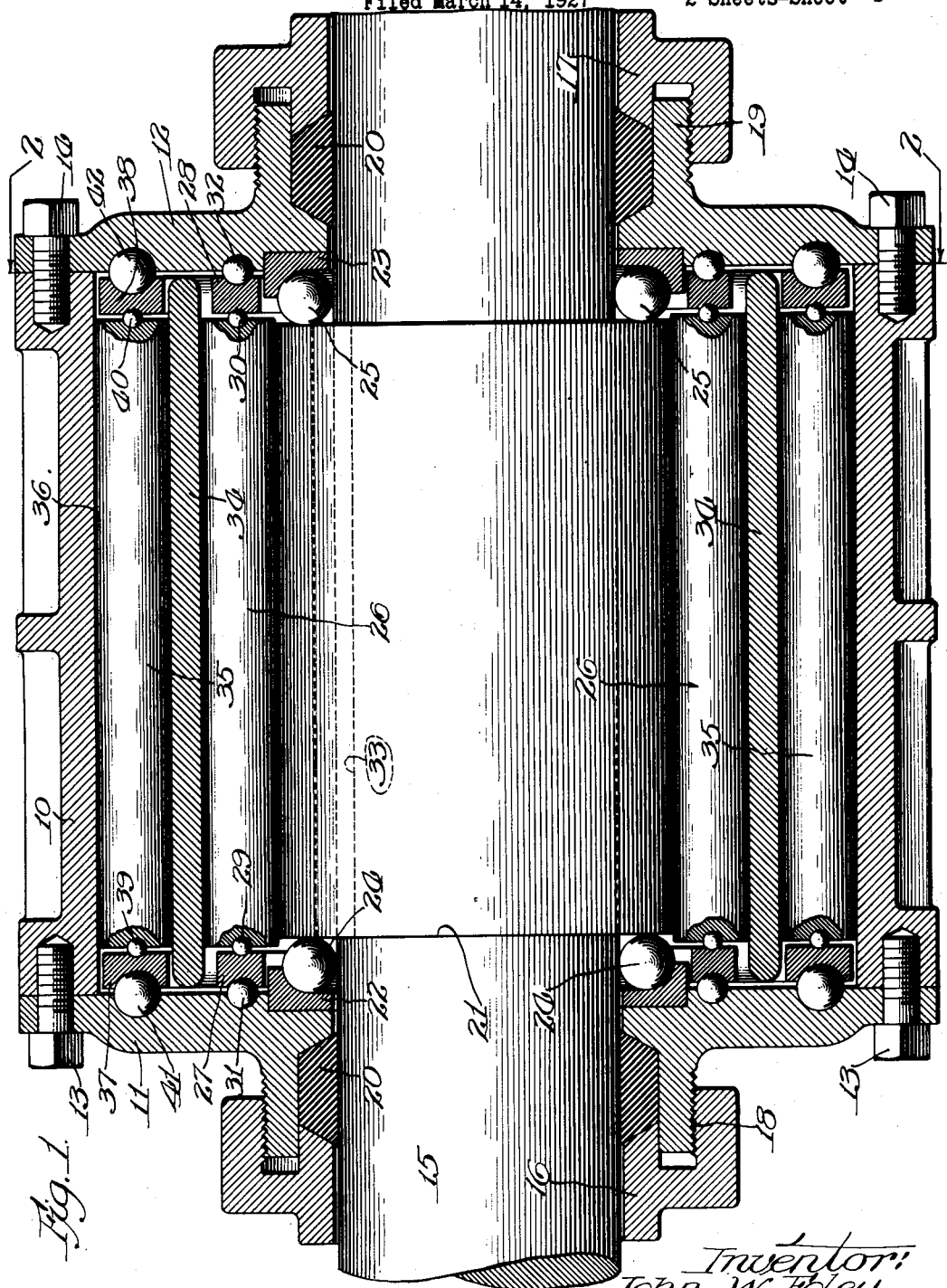

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which Figure 1 is a longitudinal sectional view of a bearing of this character constructed in accordance with the principles of this invention.

Figure 2:
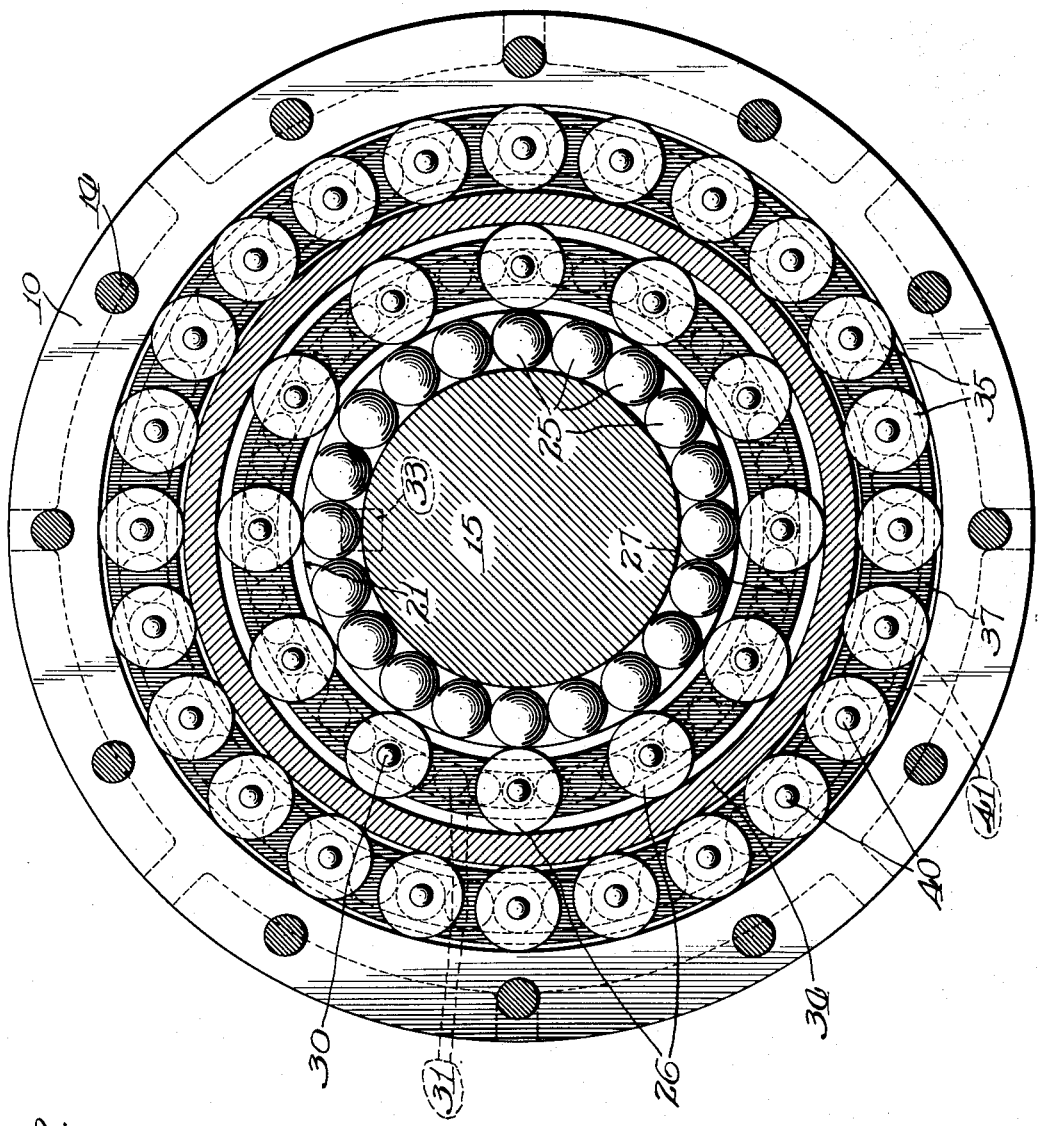

Figure 2 is a transverse sectional view taken on line 2—2, Figure 1.

Referring more particularly to the drawings the numeral 10 designates generally a casing which may be of any desired size and connected with the casing are end members 11—12, respectively secured in position by means of bolts 13—14 so that the end members may be removed when desired.

The numeral 15 designates a shaft which passes through the end members 11 and 12, and encompassing the shaft adjacent the respective end members are bearing members 16—17 which have threaded engagement as at 18—19 with the respective end members, packing 20 being disposed between the end members and the respective bearing members 16—17, whereby tight joints may be provided.

Connected with the shaft 15 within the housing or casing thus formed, is a sleeve 21, which is of an external diameter slightly larger than the diameter of the shaft and is of a length to terminate short of the end members of the casing. Bearing members 22—23 are arranged adjacent the respective end members 11—12, and roller bearings 24—25 in the form of balls are arranged between the ends of the sleeve 21 and the respective bearing members 22—23.

Encompassing the sleeve 21 and having a rolling contact therewith are a series of elongated rollers 26 which terminate short of the end members of the casing.

Annular members 27—28 encompass the shaft 15 and are disposed between the ends of the rollers 26 and the respective end members 11—12 and spaced from both. Balls 29—30 are arranged between the ends of the rollers 26 and the adjacent faces of the annular members 27—28 and have rolling contact with both, and balls 31—32 are arranged between the respective annular members 27—28 and the adjacent end members 11—12 and have rolling contact with both. These annular members together with the balls form end thrust bearings for the rollers 26.

The sleeve 21 is secured to the shaft 15 for rotation therewith in any desired or suitable manner, such as by means of a key or fastening device 33.

The rollers 26 are preferably of a length substantially equal to the length of the sleeve 21 and encompassing these rollers 26 is a sleeve 34 against the inner face of which the rollers 26 have a rolling contact, so that these rollers will contact with the inner face of the sleeve 34 and also with the periphery of the sleeve 21.

The sleeve 34 is preferably of a length substantially equal to the length of the casing, and encompassing the sleeve and having rolling contact therewith are another series of elongated rollers 35 which also have a rolling contact with the inner face 36 of the housing 10.

These rollers 35 are of a length somewhat less than the length of the casing and interposed between the ends of the rollers 35 and the adjacent end walls of the casing, are annular members 37—38, the annular members 28—38 being concentrically arranged.

Between the ends of the rollers 36 and the annular members 37—38 are balls 39—40 having rolling contact with each, and balls 41—42 are arranged between the annular members 37—38 and the respective end walls 11—12 of the casing and having rolling contact with each.

With this improved construction it will be manifest that the sleeve 34 floats within the casing and the direct rolling contact of the rollers 26—35 with the respective adjacent surfaces will prevent or overcome frictional binding of the parts and as the end thrusts of the rollers will be overcome by the ball bearings, a very sensitive and freely rolling bearing will be provided.

Any desired number of rollers 26 and 35 may be provided, and the rollers of the different series may be of any desired diameter with respect to the rollers of the other series.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A roller bearing embodying a casing, a shaft extending thereinto, a bearing surface carried by the shaft within said casing, a sleeve within the casing encompassing the said surface out of contact therewith and with the casing, rollers between the said sleeve and said surface and contacting with both, rollers between the periphery of the said sleeve and the wall of the casing and contacting with both, and ball bearings between the ends of the first recited rollers and the adjacent walls of the casing and with which ball bearings the respective rollers have direct engagement.

2. A roller bearing embodying a casing, a shaft projecting thereinto, a bearing surface carried by the shaft within the casing, rollers contacting with said surface, said rollers being spaced from each other, annular members encompassing the shaft and forming end bearings for the rollers, a sleeve encompassing said rollers and said annular members and contacting with the rollers, and rollers disposed between the periphery of the said sleeve and the casing wall and having rolling engagement with both, each of the last said rollers being out of contact with the next adjacent rollers.

3. A roller bearing embodying a casing, a shaft projecting thereinto, a bearing surface carried by the shaft within the casing, rollers contacting with said surface, each of said rollers being spaced from the next adjacent rollers, annular members encompassing the shaft between the ends of said rollers and the respective adjacent end walls of the casing, bearings between the annular members and the adjacent ends of the respective first said rollers, rollers between the annular members and the respective adjacent end walls of the casing, a freely rotatable sleeve encompassing the first said rollers and the said annular members and contacting with the first said rollers, and rollers disposed between the periphery of the sleeve and the casing wall and having rolling engagement with both, each of the last recited rollers being spaced from the next adjacent rollers.

4. A roller bearing embodying a casing, a shaft projecting thereinto, a bearing surface carried by the shaft within the casing, rollers contacting with said surface, each of said rollers being spaced from the next adjacent rollers, annular members encompassing the shaft between the ends of said rollers and the respective adjacent end walls of the casing, bearings between the annular members and the adjacent ends of the respective first said rollers, rollers between the annular members and the respective adjacent end walls of the casing, a freely rotatable sleeve encompassing the first said rollers and the said annular members and contacting with the first said rollers, rollers disposed between the periphery of the sleeve and the casing wall and having rolling engagement with both, each of the last said rollers being spaced from the next adjacent rollers and end thrust roller bearings between the ends of the last recited rollers and the respective adjacent end walls of the casing and contacting with the last said ends.

5. A roller bearing embodying a casing, a shaft projecting thereinto, a bearing surface carried by the shaft within the casing, rollers contacting with said surface, each of said rollers being spaced from the next adjacent rollers, bearings between the ends of the rollers and the respective end walls of the casing, a freely rotatable sleeve encompassing said surface and contacting with said rollers, rollers disposed between the periphery of the sleeve and the casing wall and having rolling contact with both, each of the last said rollers being spaced from the next adjacent rollers, annular members encompassing the said surface and disposed between the ends of the last recited rollers and the casing end walls and contacting the ends of the rollers, said members being detached from the rollers, and rollers respectively between the said annular members and the ends of the last recited rollers and the casing walls.

6. A roller bearing embodying a casing, a shaft projecting thereinto, a bearing surface carried by the shaft within the casing, rollers contacting with said surface, each of said rollers being spaced from the next adjacent rollers, bearings between the ends of the rollers and the respective end walls of the casing, a freely rotatable sleeve encompassing said surface and contacting with said rollers, rollers disposed between the periphery of the sleeve and the casing wall and having rolling contact with both, each of the last said rollers being out of contact with the next adjacent rollers, annular members encompassing the said surface and disposed between the ends of the last recited rollers and the casing end walls, said members being detached from the rollers, and rollers respectively between the said annular members and the ends of the last recited rollers and the casing walls, all of the said rollers having free and independent rotary movements in directions about the said bearing surface.

7. A roller bearing embodying a casing, a shaft projecting thereinto, a bearing surface carried by the shaft within the casing concentrically arranged series of rollers encompassing said surface, one of said series having rolling contact with said surface and another series having rolling contact with the casing wall and a freely rotatable sleeve disposed between said series and being of a length substantially equal to the length of said casing, one of said series of rollers having rolling contact with the inner periphery of the sleeve and the other series of rollers having rolling contact with the outer periphery of the sleeve, each of the rollers of each of the said series being spaced from and maintained out of contact with the next adjacent rollers of the respective series.

8. A roller bearing embodying a casing, a shaft projecting thereinto, a bearing surface carried by the shaft within the casing, concentrically arranged series of rollers encompassing said surface, one of said series having rolling contact with said surface and another series having rolling contact with the casing wall, a freely rotatable sleeve disposed between said series and being of a length substantially equal to the length of said casing, one of said series of rollers having rolling contact with the inner periphery of the sleeve, and the other series of rollers having rolling contact with the outer periphery of the sleeve, each of the rollers of each of the series being spaced from and maintained out of contact with the next adjacent rollers of the respective series, concentrically arranged annular members adjacent the ends of the respective series of rollers, and rollers between each of the concentric members and the casing end walls and the adjacent ends of the rollers of the respective series.

9. A roller bearing embodying a casing, a shaft projecting thereinto, a bearing surface carried by the shaft within the casing, concentrically arranged series of rollers encompassing said surface, one of said series having rolling contact with said surface and another series having rolling contact with the casing wall, a freely rotatable sleeve disposed between said series and being of a length substantially equal to the length of said casing, one of said series of rollers having rolling contact with the inner periphery of the sleeve and the other series of rollers having rolling contact with the outer periphery of the sleeve, each of the rollers of each of the series being spaced from and maintained out of contact with the next adjacent rollers of the respective series, concentrically arranged annular members adjacent the ends of the respective series of rollers, and rollers between each of the concentric members and the casing and walls and the adjacent ends of the rollers of the respective series, the said concentric members being independent of each other and detached from the rollers of the respective series.

In testimony whereof I have signed my name to this specification, on this 11th day of March, A. D. 1927.

JOHN W. FOLEY.